Patented Nov. 16, 1937

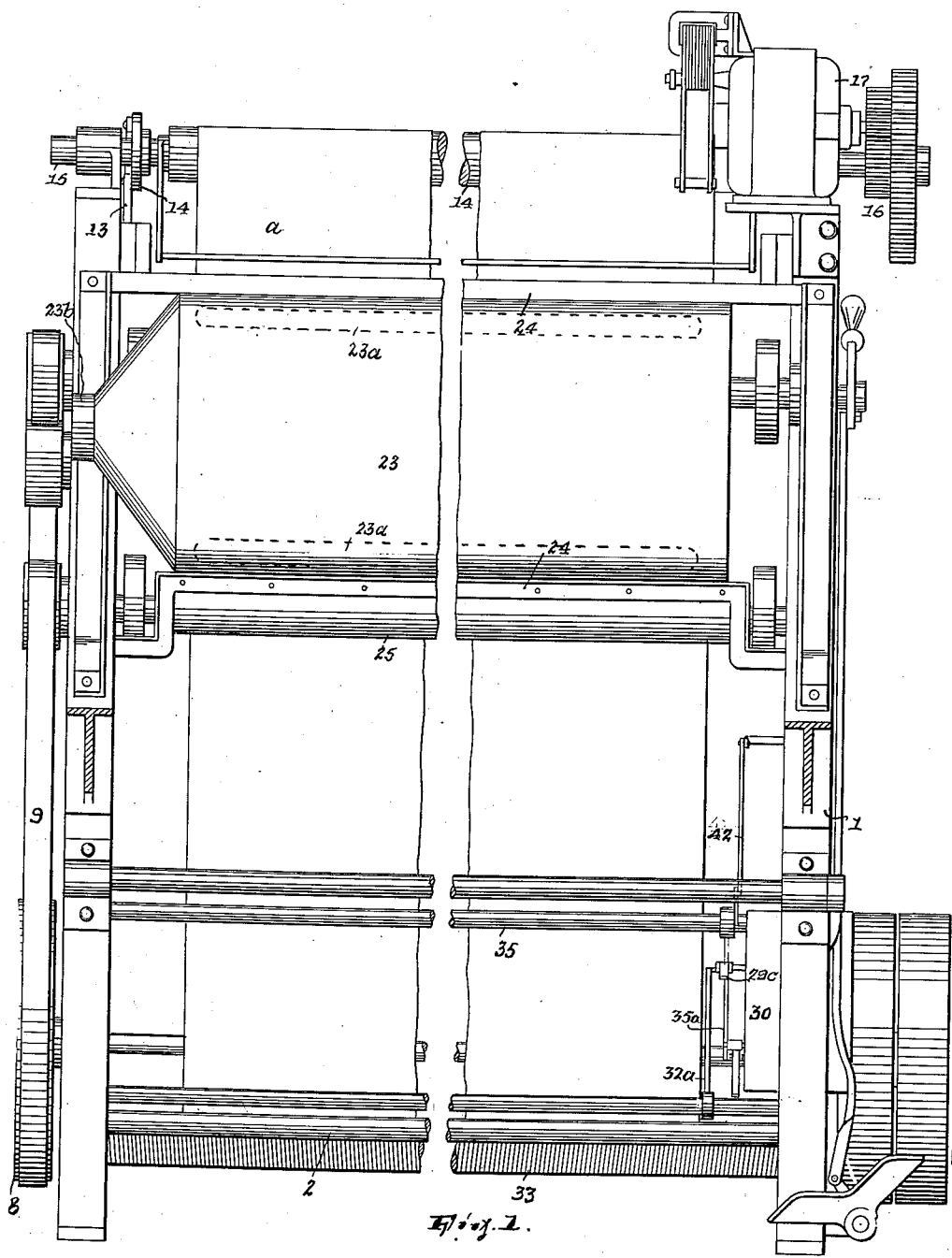

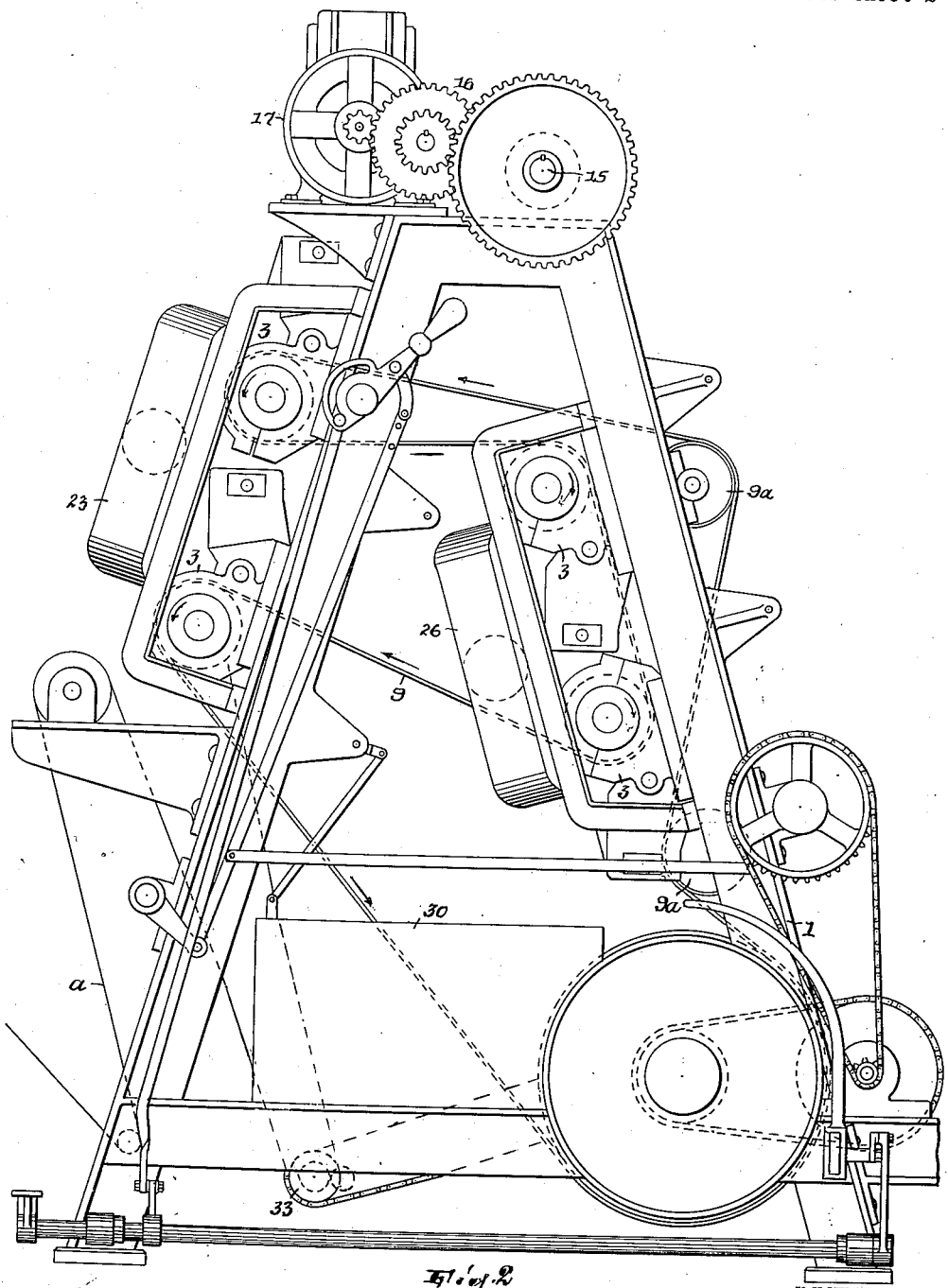

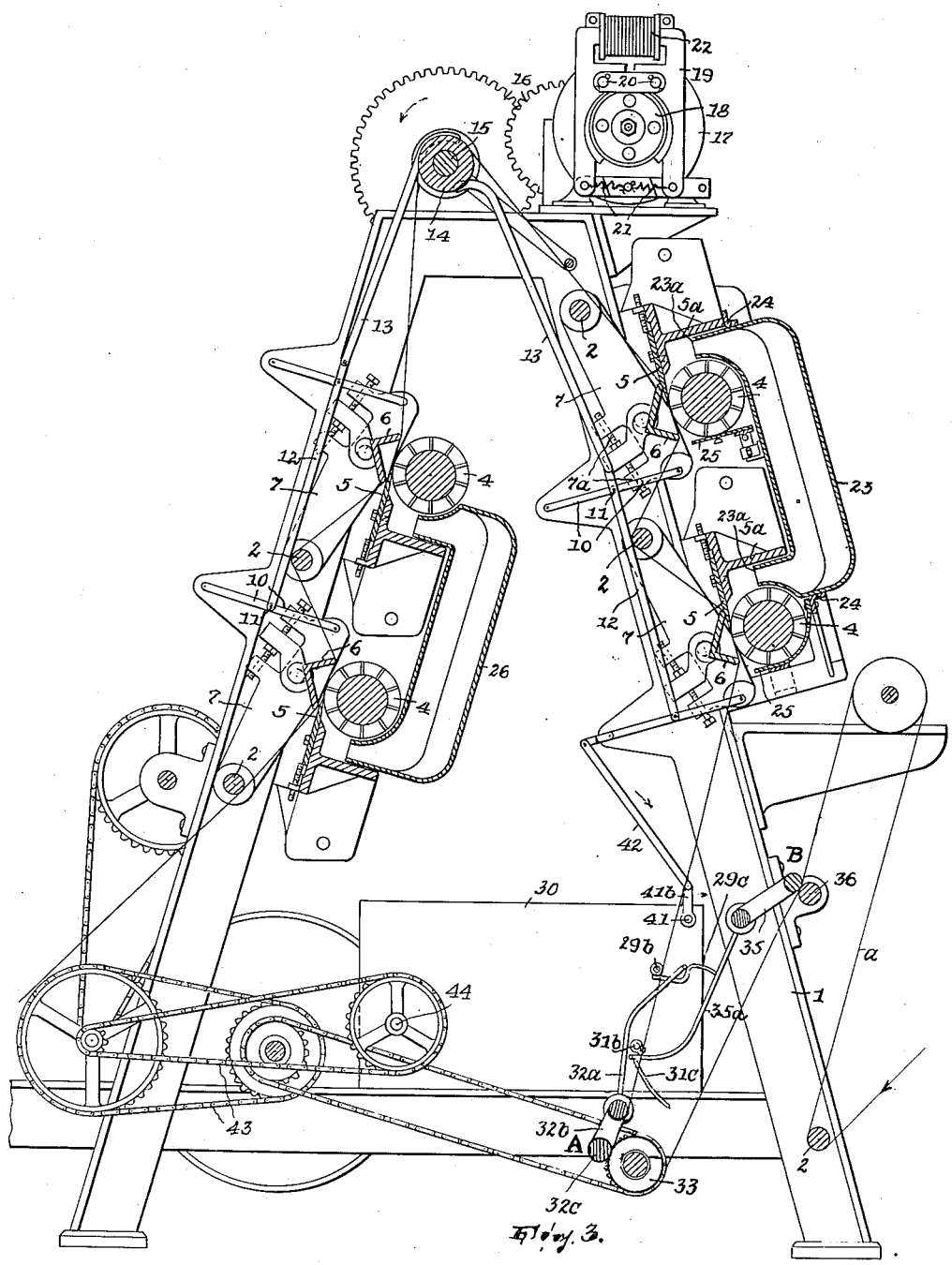

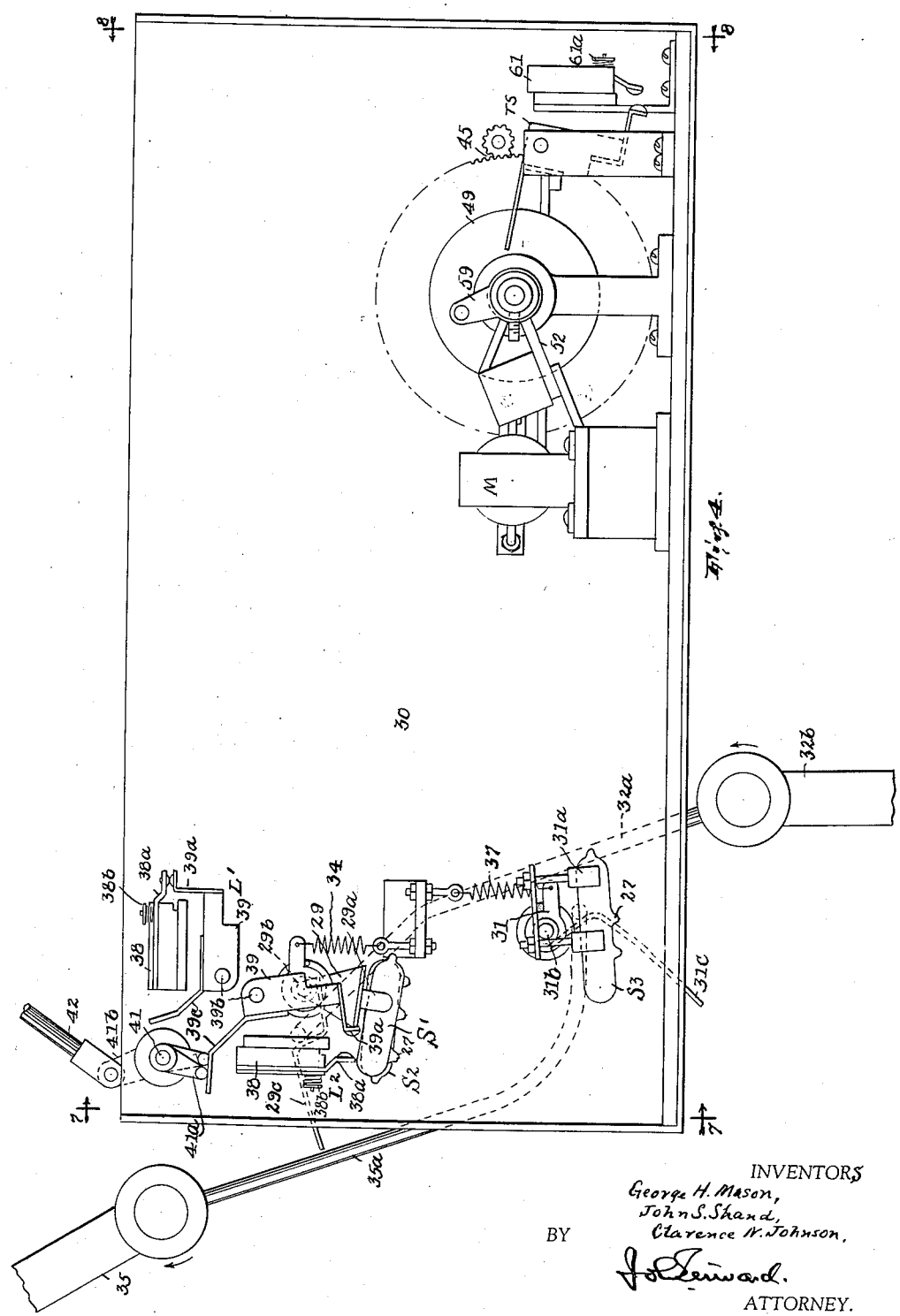

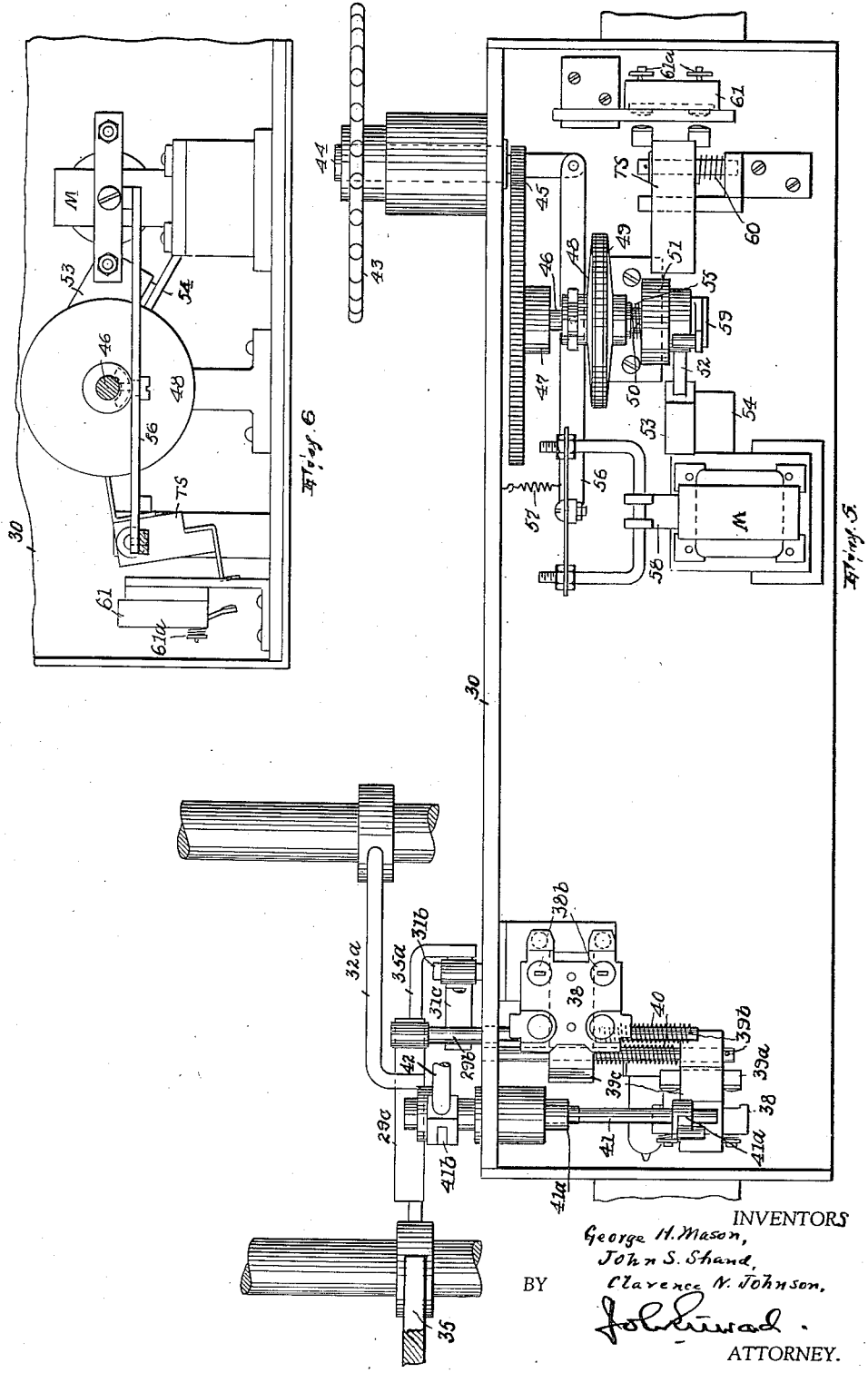

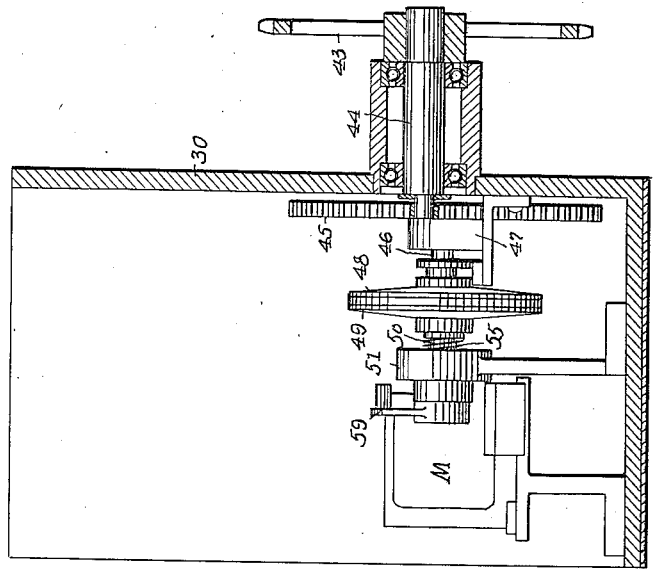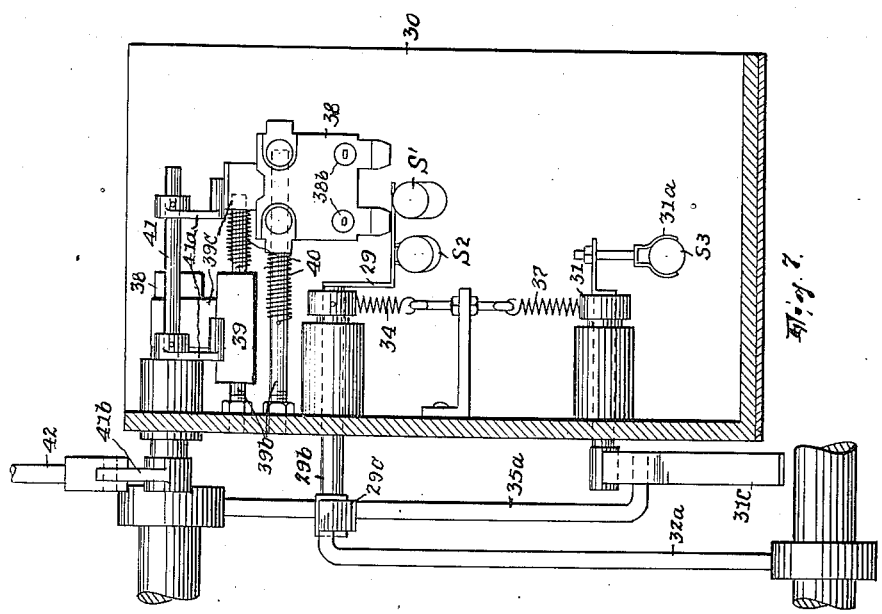

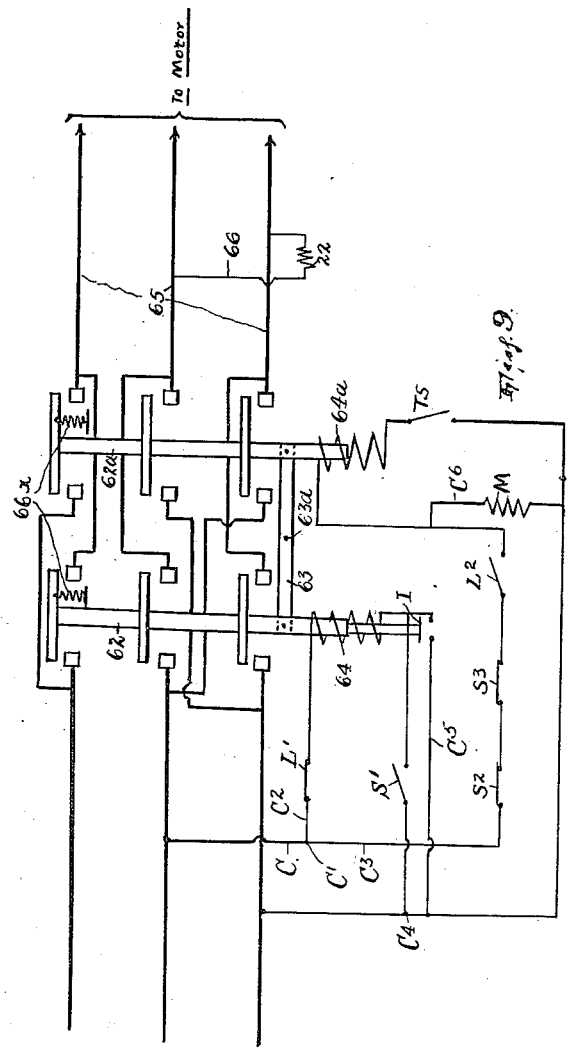

2,099,027

UNITED STATES PATENT OFFICE 2,099,027

FABRIC SHEARING MACHINE

George H. Mason, Glen Rock, and John S. Shand, Paterson, N. J., and Clarence N. Johnson, New Brighton, N. Y., assignors to Hermas Machine Company, Hawthorne, N. J., a corporation of New Jersey Application February 18, 1935, Serial No. 6,960

18 Claims. (Cl. 26—17)

This invention relates to machines for shearing cloth so as to remove from the surface thereof projecting threads and the like. The means for shearing usually comprises one or more rotary shears or cutters and their coacting ledger blades in operative relation to which the cloth, suitably made to travel lengthwise of itself, is held by cloth-rests or guides. The cloth is usually composed of a number of lengths stitched together end for end, leaving projecting seams. These cannot pass the shearing means with the cloth-rests in operative position without shearing the seams and the danger of parting the cloth, so the cloth-rests are made retractive. Heretofore they have been retracted by hand by the attendant each time a seam passed through the machine. One object of this invention is to provide for the opening of the cloth-rests to allow a seam to pass and their ensuing closing automatically.

In the case where there are a plurality of shearing means and their cloth-rests it is desired to save floor-space and for this purpose we give the frame of the machine an upwardly converging form, arranging units comprising one or more shearing means and the cloth-rest or cloth-rests therefor on opposite upstanding sloping sides of such frame. These machines usually include means for withdrawing the cuttings including a conduit whose intake end adjoins the cutting point (or, if there are a plurality of shearing means, the conduit has branches with intake ends adjoining the respective cutting points) and whose outlet end communicates with a suction medium. According to this invention and in the case where there are a plurality of shearing means at the intake side of the machine this conduit is a hollow structure which serves as a guard for their cutters and has intake nozzles which are extended each parallel with one of the cutters and project in appropriate proximity to the cutting points; if there is a plurality of shearing means at the discharge side of the machine there may be a similar conduit.

The invention also contemplates novel means, where there are a plurality of cloth-rests, for actuating them in unison to effect their opening and closing movement.

In the drawings,

Fig. 1 is a front elevation of the machine;

Fig. 2 is a right side elevation thereof;

Fig. 3 a substantially central vertical section through Fig. 1 looking to the right;

Fig. 4 is a side elevation, Fig. 5 a plan and Fig. 6 the opposite side elevation of a box 30 and its contents, with the near wall of the box removed;

Figs. 7 and 8 are sections substantially on lines 7—7 and 8—8, respectively, Fig. 4; and Fig. 9 is a diagram of the circuit connections.

The supporting structure or frame of the machine comprises two A-shaped side standards 1 rigidly connected by bars 2. In bearings 3 at each of the front and back inclined portions of the frame are journaled the rotary cutters 4 whose coactive ledger blades 5 are affixed to the frame. Arranged to cooperate with each shearing means formed by a cutter and ledger blade is a cloth-rest comprising a cloth-rest proper 6 and a pair of levers 7 which are fulcrumed on one of the bars 2, the cloth-rest proper being pivotally adjustable in the levers by the means indicated at 7a, this in itself being according to the known construction. The cloth-rests which adjoin the front of the machine depend, and those which adjoin the back of the machine, upstand from their respective fulcra, for a purpose to appear. The cloth-rests are all at the relatively rear sides of the corresponding cutters. The cutters are rotated from a pulley 8, suitably driven, through an endless belt 9 which is trained around pulleys on the cutters and idlers 9a. The cloth, drawn through the machine from front to rear by any suitable take-up (not shown), is trained around guides (Fig. 3) of which some may be the bars 2, passing up between the front pair, and down between the rear pair, of cutters and their cloth-rests.

For each cloth-rest, at each end thereof, there are links 10 pivotally connected together at 11 and one connected to the frame and the other to the cloth-rest; these we term folding links. The connections 11 for each pair of upper and lower folding links are connected by a link 12. Each of the two such links 12 is connected to a link 13. The two such links 13 at the front and the two at the rear are connected at rotatively offset points of and to disks 14 which are affixed to a shaft 15 journaled at the top of the frame and which is geared, at 16, to a reversible electric motor 17. The folding links for the front pair of cloth-rests project inwardly, and for the rear pair outwardly, thereof, the former being adapted to fold in moving upward and the latter in moving downward. When shaft 15 is driven clockwise in Fig. 3 to the position shown the links are all extended so that the cloth-rests are in coactive relation to the corresponding cutters; when said shaft is driven anti-clockwise the links are collapsed or folded to retract the cloth-rests.

The purpose in arranging the two pairs (front and rear) of cloth-rests so that they extend in opposite directions from their fulcra is to obtain their counterbalance. It will further be noted that in the closed positions of the cloth-rests they are held in that position (against the ledger blades as stops) automatically because then the pivoted connections between links 13 and the disks 14 are in dead center relation to the shaft 15.

A brake for the motor is shown in Fig. 3 where 18 is the brake-drum on the motor armature shaft. 19 is a pair of levers fulcrumed at 20 and serving as brake-shoes to engage the drum, being normally urged against the same by springs 21, and 22 is an electro-magnet for retracting the levers to free the drum.

At 23 is a hood formed as a hollow body supported on the frame at the front thereof by stretchers 24 (Fig. 1) and reaching laterally the full length of the two front shearing means. At the side adjoining the frame it has two intake nozzles 23a respectively reaching into the spaces formed between the cutters of such means and the girts 5a to which the ledger blades 5 are affixed and extending laterally substantially the full length of the shearing means; at one end it has a discharge nozzle 23b which may be connected to any suction means. Thus the cuttings discharged by the shearing means may be drawn away. A hone 25 for the blades of each cutter is shown attached to the hood. When the shearing is proceeding a nearly closed space, whose suction inlet is afforded by the corresponding nozzle 23a, is formed around each cutter by the hood, the hone, the positioned cloth and the girt. The construction is further such that the hood and lower hone form a guard for both cutters, protecting the operator, whose normal position is at the front of the machine. A hood 26, similar to hood 23 and similarly related to the two rear cutters (that is, at the inside of the frame, or at the side of the cutters opposite to that occupied by the cloth a) may be provided to dispose of the cuttings discharged by such cutters, and it may be equipped with hones (not shown) for such cutters.

When a seam or other undue thickening in the cloth enters the machine the cloth-rests are retracted, are caused to stand retracted until all the cloth-rests are passed by such portion and are then returned to their operative relation to the shearing means, all automatically.

There are shown in Figs. 4 and 7 three mercury circuit making and breaking devices or, as we term them, switches S', S2, S3, each as usual consisting of an elongated mercury-containing glass bulb having longitudinally offset depending portions 27 through which may be extended as usual terminals in the circuit to be controlled and which are to be jointly contacted or not by the mercury according to the direction in which the device is tilted. Switches S' and S2 are held in clips 29a of a common lever 29 suspended by means of its pivoting shaft 29b from one wall of a box 30, and their relation is such that when the compound switch device thus formed has been rocked clockwise (or as shown) the circuit will be closed by the switch S' and opened by switch S2, and when it has been rocked anticlockwise the circuit will be closed by switch S2 and opened by switch S'. Switch S3 is also held in clips, as 31a, of a lever 31 supported by means of its pivoting shaft 31b in said wall of the box; it forms a unitary switch device. The compound switch device has on its shaft 29b an arm 29c suitably bent to coact with the bent-off end of the arm 32a of one of two suitably fulcrumed levers 32b rigidly connected by a bar 32c which is urged by gravity against the cloth as it travels around a bar 33 connecting said frame sides and which may be the usual suitably driven cloth spreader; thus parts 32a, 32b and 32c form a feeler lever (generally denoted A in Fig. 3) which will be actuated by seams or undue lumps occurring in the cloth and which when so actuated will move the compound switch device from the position in which it is normally held (Fig. 4) by a spring 34, or anti-clockwise. The unitary switch device also has on its shaft 31b an arm 31c suitably bent to coact with the bent-off end of the arm 35a of a lever (generally denoted B in Fig. 3) forming a feeler to coact with a fixed bar 36 substantially all the same as in the case of the first feeler. This switch is held in the normally closed position (Fig. 4) by the spring 37.

There are also two limit switches L' and L2 both of the same general construction and each adapted to contact with a pair of terminals 38a of a fixed member 38 (to which terminals in the circuit are to be connected, as at 38b) and consisting of a member 39 having a circuit-closing portion 39a and pivoted in said wall of the box by means of a shaft 39b. Each limit switch is normally urged to closed position by a spring 40 connected at its ends to the switch and its shaft 39b (Figs. 5 and 7). A controller consisting of a shaft 41 having two crank arms 41a to engage the wings 39c of the limit switches is connected by its arm 41b through a link 42 with an extension of one of the links 10 and affords means to control the limit switches. When the controller moves it allows switch L2 to close first and opens switch L' at the end of such movement, and when it returns it allows switch L' to close first and opens switch L2 at the end of such return movement.

When the motor begins to open the cloth-rests timing mechanism goes into action to determine the time when the energy will be applied to the motor to drive it reversely to close the cloth-rests, thus:

Through sprocket-and-chain connections 43 in Fig. 3 a shaft 44 (Fig. 5) journaled in said wall of the box is driven from the shaft of pulley 8 and through gearing 45 said shaft drives a shaft 46 journaled in a bearing 47 and having splined thereon a clutch-member 48. Opposed to such clutch-member is a clutch-member 49 fixed on a sleeve 50 revoluble on shaft 46 and in a bearing 51 and having affixed thereto a timer arm 52 preferably having a weight 53, the rotary element 49—50—52 being normally urged anti-clockwise to bring the arm against a stop 54 by a spring 55 connecting said element with bearing 51. The clutch-member 48 is engaged by a lever 56 on which a spring 57 acts normally to hold said clutch-member in open position. Said clutch-member is adapted to be moved to closed position by an electro-magnet M whose armature 58 is connected to the lever. A rotatively adjustable part of said element is an arm 59 which is adapted to engage the timer switch TS (normally held in open position by a spring 60) and shift it into closing relation to the fixed member 61 having terminals 61a to which to connect terminals in the circuit. When, as will appear, the cloth-rests are started to move to their open positions the magnet M establishes the clutch and the element 49—50—52 is rotated clockwise (a distance depending on the adjustment of the arm 59 around said element) against the tension of spring 60 to move timer switch TS to closed position for establishing the circuit whereby to drive the motor reversely (to close the cloth-rests) until the circuit is again interrupted, the magnet being kept energized until such time, whereupon, being deenergized, the spring returns said element to its normal position against stop 54.

Referring to the diagram showing the circuit connections, Fig. 9: A switch is provided which is adapted to be moved to and held in position for directing the energy to the motor for forward driving, and to be moved and held in another position for directing the energy to the motor for reverse driving, of the driven element (armature) of the motor. In the present example this switch consists of so-called interlocking contactors 62—62a connected by a lever 63 (pivoted at 63a) and forming the armatures of electro-magnetic actuating means comprising actuators in the form of solenoids 64—64a, the service lines 65 being adapted to be closed by one or the other of the contactors for driving the motor forward or reversely and the wiring (shown by heavy lines) for this purpose conforming with a known system where, as here, the motor is of the three-phase alternating-current type. From one service line and back to another extends conductor C which divides at C', one division C2 including the break (at 38a) controlled by switch L', the solenoid 64 and the break controlled by switch S' (at 27) in the order named, and the other division C3 including the breaks controlled by the switches S2 and S3 (at 27) and L2 (at 10a), solenoid 64a and switch TS, the divisions merging again at C4. From beyond solenoid 64 a shunt C5 leads from division C2 to branch C3 which has a break controlled by switch I that is connected to contactor 62. A shunt C6 of division C3 containing the magnet M extends around solenoid 64a and switch TS.

Operation: Assume the switches S', S2, S3, L' and L2 to be in the positions shown in Fig. 9. A seam or lump (hereafter termed a thickening) actuates feelers B and A. Disregarding feeler B for the meanwhile, feeler A rocks the twin switches S'—S2 so that S2 breaks the circuit with respect to solenoid 64a and S' closes the circuit with respect to solenoid 64. S2 breaks the circuit before S' closes because, as will appear from Fig. 4 it is more nearly horizontal when at rest. Of course following such actuation the twin switches immediately resume such rest or normal position under the influence of spring 34. The closing as to S' energizes solenoid 64 whose contactor then closes the service lines for forward driving of the motor and hence opening the cloth-rests; solenoid 64a is not energized because branch C3 is open at L2 and TS. At once the cloth-rests start to open they act through link 42 and controller 41 to close limit switch L2 (to start the timing, as will appear) and at the end of the opening movement open limit switch L' to stop the motor and such movement. (One purpose of switch S2 is to insure that when the solenoid 64 is to be energized for forward or cloth-rest-opening movement of the motor solenoid 64a shall be dead and another is to deenergize magnet M so that the timer arm may return to its starting point. After the former solenoid has been energized any vagrant energizing of solenoid 64a would be impotent to move its contactor because of the then superior pull of the former acting through lever 63. And the purpose of shunt C5 and its switch I is to maintain solenoid 64 energized when the circuit is interrupted at S'.)

When switch L2 closed it energized magnet M which closed the clutch and started the timer arm rotating toward switch TS. This, when closed by the timer arm, closes the circuit as to solenoid 64a whose contactor then closes the service line for reverse or cloth-rest-closing driving of the motor, the clutch holding switch TS closed, and this continues until the cloth-rests (having closed switch L' at the beginning of the closing movement) open switch L2, acting through 42—41.

In short, actuation of feeler A causes the motor to open the cloth-rests and at the same time starts the timing action whereby, after the cloth-rests have remained open for a given time, eventually the motor closes the cloth-rests; and on the opening and closing movements of the cloth-rests the latter themselves afford the means from which the forward or the reverse driving, as the case may be, of the motor is terminated. (Incidentally it may be noted—as will appear—that whenever feeler A and hence switches S'—S2 are actuated the circuit as to magnet M is interrupted so that if, perchance, the magnet should be holding the clutch closed and hence the timer arm moving toward switch TS such interruption will result in the de-energizing of the magnet and the return of the timer arm against its stop 54.)

Now as to the feeler B and switch S3:

Seams ordinarily occur so far apart that a second seam will not actuate feeler A during the period beginning with the opening and ending with the closing of the cloth-rests predicated upon actuation of the feeler by a preceding seam. But a vagrant thickening (usually a lump) might follow so closely as to actuate the feeler during this period. If this happens while the motor is driven forward (the cloth-rests opening) the result would be harmless, thus: The momentary movement of S'—S2 would mean an abortive closing of the circuit with respect to solenoid 64 (already energized since I and L' are closed) and the de-energizing of magnet M, allowing the timer arm to retract and (the magnet being again energized) the starting of the timer arm anew. Any actuation of feeler A in this part of the period (however late occurring therein, as were there several successive thickenings) would mean that the responsible vagrant thickening would have time to pass all the cloth-rests before they closed the same as the preceding seam.

But suppose a vagrant thickening actuated feeler A in the second part of the period. If this happened while the cloth-rests are standing open, with switch L' open, the result would be no energizing of solenoid 64 and merely the momentary deenergizing of magnet M so that the timer arm would retract and start anew its timing action, eventually to close switch TS and cause the motor to undergo its cloth-rest closing movement. But if it happened while the cloth-rests are closing, switch L' being closed immediately they start to close, the timer arm would be allowed to retract as before, stopping the reverse drive of the motor and hence the cloth-rest closing movement (leaving them partway closed), the circuit with respect to solenoid 64 would be closed (at S') and the cloth-rest or forward driving of the motor would then proceed until L' was again opened at the fully open position of the cloth-rests, and eventually the timer arm would close TS to effect the reverse driving or cloth-rest-closing movement. Now in this latter connection it has to be taken into account that the inertia of the system including the motor armature and cloth-rests does not permit instantaneous stopping of such system; and, since the cloth is travelling, (usually at quite a speed) there is a chance that the cloth-rests would close on the vagrant thickening as an incident of this inertia, i. e., that, having actuated feeler A to start the opening movement, such thickening would reach the cloth-rests the instant they are closed and the cloth be injured.

This explains the reason for feeler B and switch S3. Feeler B is placed sufficiently in advance of the cloth-rests to give the inertia time to expend itself before the thickening can reach them, the timer arm retracting and starting its time action anew; and when the thickening now actuates feeler A the cloth-rests are started (by the closing of S') to open from their partly or fully open position, as the case may be, and the timer arm again retracts and starts its timing action anew.

Feeler B in fact acts whenever any thickening (seam or lump) passes it, but it has no effect except to start the timing anew and cut off the reverse driving of the motor if that is going on.

The magnet 22 which controls the motor brake is in a line 66 connecting two of the service lines. When these are closed by either contactor for driving the motor in either direction this magnet is energized, retracting the brake, and as soon as they are opened the brake is released so as to stop the motor armature shaft and hence the driving influence.

For the solenoids and their contactors any electro-magnetic devices having their armatures movable to establish or disestablish the connection between the motor and its energy source (as the service lines) are contemplated.

Having thus fully described our invention what we claim is:

1. In a cloth-shearing machine, the combination with supporting structure and a shearing unit and a cloth-rest unit arranged therein, of means to move one of said units including a motor, a switch movable to direct energy to the motor, a circuit to be closed, an electro-magnetic actuator for the switch arranged in said circuit, a constantly moving element, and a member to close the circuit clutchable with said element to be moved thereby.

2. In a cloth-shearing machine, the combination, with supporting structure and a shearing unit and a cloth-rest unit arranged therein, of means to move one of said units including a motor having the driven part thereof forming with the latter unit a driven system, a switch movable to direct energy to the motor and normally held retracted, a circuit to be closed, an electro-magnetic actuator for the switch arranged in said circuit, a constantly moving element, and a member to close the circuit clutchable with said element to be moved thereby, said system when moved being adapted to disrupt the circuit.

3. In a cloth-shearing machine, the combination, with supporting structure and a shearing unit and a cloth-rest unit arranged therein, of means to move one of said units including a motor, a switch movable to direct energy to the motor, a circuit to be closed, an electro-magnetic actuator for the switch arranged in said circuit, a constantly moving element, a member to be moved by said element to close the circuit, a clutch movable to clutch said member to said element, and means, controlled by the moving cloth, to move the clutch.

4. In a cloth-shearing machine, the combination, with supporting structure and a shearing unit and a cloth-rest unit arranged therein, of means to move one of said units including a motor having the driven part thereof forming with the latter unit a driven system, a switch movable to direct energy to the motor and normally held retracted, a circuit to be closed, an electro-magnetic actuator for the switch arranged in said circuit, a constantly moving element, a member to be moved by said element to close the circuit, a clutch movable to clutch said member to said element, and means controlled by the moving cloth, to move the clutch, said system when moved being adapted to disrupt the circuit.

5. In a cloth-shearing machine, the combination, with supporting structure and a shearing unit and a cloth-rest unit arranged therein, of means to move one of said units from and toward the other including a reversible motor having the driven part thereof forming with the latter unit a driven system, a normally retracted switch movable to one position to direct energy to the motor for driving its driven element forward and to another position for driving said element reversely, means, controlled from the moving cloth, to move the switch to and hold it in the first position and then move it to and hold it in the second position, and means, actuated by said system between and after said movements of the switch, to cause the second-named means to release the switch.

6. In a cloth-shearing machine, the combination, with supporting structure and a shearing unit and a cloth-rest unit arranged therein, of means to move one of said units from and toward the other including a reversible motor having the driven part thereof forming with the latter unit a driven system, a normally retracted switch movable to one position to direct energy to the motor for driving its driven element forward and to another position for driving said element reversely, means, including an electro-magnetic actuator for the switch and a circuit containing the actuator and adapted to be closed by the moving cloth, to move the switch to and hold it in the first position, means, including another electro-magnetic actuator for the switch, a circuit containing said actuator and timer means to close the latter circuit adapted to be set in actuation by the moving cloth, to move the switch to and hold it in the second position, and means, actuated by said system, to disrupt the first-named circuit between, and then the second-named circuit after, said movements of the switch.

7. In a cloth-shearing machine, the combination, with supporting structure and a shearing unit and a cloth-rest unit arranged therein, of means to move one of said units from and toward the other including a reversible motor having the driven part thereof forming with the latter unit a driven system, a normally retracted switch movable to one position to direct energy to the motor for driving its driven element forward and to another position for driving said element reversely, means, including an electro-magnetic actuator for the switch and a circuit containing the actuator and adapted to be closed by the moving cloth, to move the switch to and hold it in the first position, means, including another electro-magnetic actuator for the switch, a circuit containing said actuator and timer means to close the latter circuit, adapted to be set in actuation by the moving cloth, to move the switch to and hold it in the second position, means, actuated by said system, to disrupt the first-named circuit between, and then the second-named circuit after, said movements of the switch, and means, arranged in advance of the point where the moving cloth sets in actuation the timer means, for disrupting the second circuit.

8. In a cloth-shearing machine, the combination, with supporting structure and a shearing unit and a cloth-rest unit arranged therein, of a motor having its driven element operatively connected to one unit to move the same, an electric circuit, an electro-magnetic actuator in the circuit, a switch to be held by the actuator when the circuit is closed in position to direct energy to the motor and normally held retracted from said position, and means, actuated from the moving cloth, to break the circuit.

9. In a cloth-shearing machine, the combination, with supporting structure and a shearing unit and a cloth-rest unit arranged therein, of means to move one of said units from and toward the other including a reversible motor having its driven element operatively connected with the movable unit and mechanism, controlled by the moving cloth, for directing energy to the motor for driving it first in one direction and then in the other.

10. In a cloth shearing machine, the combination of supporting structure, a shearing unit and a cloth-rest unit arranged therein, a motor having its driven element connected with one of such units and confined to move therewith back and forth, a switch movable to one position to direct energy to the motor for driving the system including said driven element and unit in one direction and to another position to direct energy to the motor for driving said system in the other direction, and means, controlled by the moving cloth, to move the switch to one of said positions.

11. In a cloth shearing machine, the combination of supporting structure, a shearing unit and a cloth-rest unit arranged therein, a motor having its driven element connected with one of such units and confined to move therewith back and forth, means controlled by the moving cloth, to direct energy to the motor for causing the same to drive the system including said driven element and unit in one direction, and means, controlled by said system, when moved, to direct energy to the motor for causing the same to drive said system in the opposite direction.

12. In a cloth shearing machine, the combination of supporting structure, a shearing unit and a cloth-rest unit arranged therein, a motor having its driven element connected with one of such units and confined to move therewith back and forth, means controlled by the moving cloth, to direct energy to the motor for causing the same to drive the system including said driven element and unit in one direction, and means, controlled by said system, when moved, to direct energy to the motor for causing the same to drive said system in the opposite direction, such second-named means including means to predetermine the time when said second-named means shall direct energy to the motor.

13. In a cloth-shearing machine, the combination of supporting structure, a system therein to be moved back and forth and including one of the shearing and cloth-rest units of the machine, means controlled by the moving cloth, to move said system first in one and then in the other direction normally within a given time, and means, also controlled by the moving cloth, to de-energize the first means during said time.

14. In a fabric shearing machine, the combination, with supporting structure and two shearing means arranged therein and each comprising coactive cloth-rest and shearing units one of which is movable toward and from the other, folding links foldable in relatively opposite directions, said links respectively connecting the movable units with said structure, and means to effect simultaneous folding or extending movement of the links including a rotary element journaled in said structure and to which the links are respectively operatively connected at relatively opposite eccentric points of said element.

15. In a fabric-shearing machine, the combination, with supporting structure and a shearing unit and a cloth-rest unit arranged therein, of an electric motor, means to transmit movement from the motor armature to one of said units, the latter unit, armature and said means forming a movable system, a switch movable to direct energy to the motor field and normally held retracted, means, controlled by the moving fabric, to move the switch and hold it from its retracted position, and means, actuated by said system when moved, to cause the second-named means to release the switch.

16. In a fabric-shearing machine, the combination, with supporting structure and a shearing unit and a cloth-rest unit arranged therein, of an electric motor, means to transmit movement from the motor armature to one of said units, the latter unit, armature and said means forming a movable system, a switch movable to direct energy to the motor field and normally held retracted, a circuit having means actuable by the moving cloth to close the circuit, and an electro-magnetic actuator for the switch arranged in said circuit, said system when moved being adapted to disrupt the circuit.

17. In a cloth-shearing machine, the combination, with supporting structure and a shearing unit and a cloth-rest unit arranged therein, of means to move one of said units from and toward the other including a reversible motor having its driven element operatively connected with the movable unit and mechanism, controlled by the moving cloth, for directing energy to the motor for driving it first in the direction to move the movable unit from the other unit and then in the opposite direction, and between such movements hold the movable unit substantially at dwell.

18. In a cloth-shearing machine, the combination of supporting structure, a rotary motor having a driven element rotatable alternately to two positions, shearing means comprising a cloth-rest unit and a shearing unit one of which is movable toward and from the other and is coupled with said element to be moved thereby toward the other unit when said element is moved to one position and from the other unit when said element is moved to the other position, and mechanism, controlled by the moving cloth, for directing energy to the motor for driving said element to said positions in alternation.

GEORGE H. MASON.
JOHN S. SHAND.
CLARENCE N. JOHNSON.